Nov. 16, 1926.

A. W. ROCKWOOD 1,606,900

CORRUGATED TRIMMING AND PROCESS OF MAKING SAME

Filed Dec. 18, 1925

Inventor
A. Waldo Rockwood
by James R. Hodder
Attorney

Patented Nov. 16, 1926.

1,606,900

UNITED STATES PATENT OFFICE.

A. WALDO ROCKWOOD, OF MELROSE, MASSACHUSETTS.

CORRUGATED TRIMMING AND PROCESS OF MAKING SAME.

Application filed December 18, 1925. Serial No. 76,347.

My present invention is a novel and improved corrugated trimming for use on automobiles, shoes, articles of clothing and the like, and includes the novel process of manufacturing the same.

In the manufacture of shoes, slippers, pumps, girdles, automobiles and other articles, and in many other lines of modern manufacturing, it is desirable to have a crinkled or corrugated trimming, for ornamental as well as useful purposes, and one which will have a certain amount of stretch or "give" to it, without destroying or marring the corrugated surface of the trimming.

Prior to my inventions, the method of producing such corrugated trimming was to utilize an elastic base, with which was assembled the material designed for the facing of such trimming, and attach the same, while the elastic was under tension, by stitching longitudinally of the same. This longitudinal stitching or attaching is undesirable for many reasons. For example, the exposed surface of the trimming was marred by the attaching devices penetrating the same; the material would not retract evenly or form a neat finished appearance; and the "give" or stretch of the same was limited by the stretching properties of the stitches or other attaching devices. Thus in utilizing such trimming for automobile welting, for example, the workman, in endeavoring to stretch the trimming around curved portions, would frequently break these longitudinal stitches, and the welting was ruined, because the component parts would come apart and cause an unsightly appearance, or the welting or trimming would have to be replaced. The same objections were true in the use of such trimming on shoes, girdles, or other articles of clothing.

An important feature of my present invention, therefore, is to provide such a trimming composed of materials which will have great lasting and wearing qualities, and which will not break, tear, or come apart in use, as well as to have the surface of such trimming, imperforate, and unmarred by stitching, stapling, or other fastening devices.

To this end I have devised my novel crinkled or corrugated trimming, comprising a facing of any suitable material, such as thin or soft leather, silk, satin, suede, or any other material desired, secured to an underbody of elastic goring or webbing in a firm and strong manner, by stitching, stapling or the like, and with the fastening devices hidden or concealed beneath the facing material, thus forming an invisible bond between the leather facing and elastic webbing.

In carrying out the present novel process of my invention, I utilize strips of such material as may be desirable for the ornamental facing of the trimming, such strips being of any desired width or length. A strip of this material is then assembled with an underbody of elastic webbing or goring, preferably of equal width with that of the facing strip, and the elastic webbing placed under tension to any desired length. Thereupon the facing strip is secured to the elastic webbing by stitching, or other fastening means, transversely of the two strips. In attaching the two strips together, the operator turns back the facing material upon itself, and runs the two strips through a machine for stitching, stapling or the like, at the edge or fold of the material so turned back. The operator then lays the facing strip on the elastic goring, allowing a predetermined spacing between the transverse lines of fastening, which spacing may be determined by suitable markings on the said strips, or by the experience of the operator; turns the strip of facing material back upon itself at the next predetermined fastening point, and repeats the operation of stitching or attaching through the bend or fold and the elastic strip; and repeats this operation until a desirable or predetermined length of such trimming has been produced.

Upon completion of the attaching operation and the release of the tension upon the elastic strip, the elastic webbing will then return to its normal consistency, which will of necessity corrugate or crinkle the facing strip thereon, substantially as shown in the drawings herein. It will be appreciated that by thus applying blind, concealed or hidden fastenings, an invisible bond or union between the elastic webbing and the facing strip is effected, which is of great importance in articles of this nature.

I believe that my novel trimming, as thus constructed, is new and useful, and I desire to claim the same broadly herein.

I also believe that my process of constructing this corrugated trimming is new, and I wish also to claim this herein.

Further features of the invention, details and advantages will be hereinafter more fully pointed out and claimed.

Referring to the drawings, illustrating preferred embodiments of my present invention, Fig. 1 is a perspective fragmentary detail, enlarged, of my novel trimming during the process of manufacture;

Figure 1:
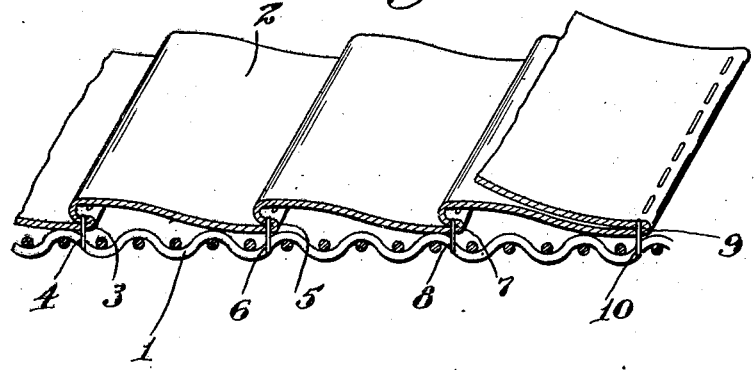

As shown in the drawings, a strip of elastic webbing or goring 1 is placed under tension. The operator then applies a strip 2, of leather, kid, suede, silk, satin or other suitable or desirable trimming material, to the elastic strip, folds the material back upon itself, as clearly illustrated at 3, and unites the facing material and elastic strip by a row of transverse stitching 4. The material is then moved forward upon the elastic strip to a predetermined position, which may be indicated on the facing strip by suitable markings if desired, or which predetermined position may be indicated by the eye of the operator, the strip 2 folded back at the bend 5, and a row of transverse stitching 6 applied. The operation is repeated and the facing strip 2 turned back at 7 and united to the elastic strip 1 by a row of transverse stitching 8. At 9 is clearly illustrated the method of turning the strip 2 back upon itself and the application of the row of transverse stitching 10, the strip 2 being now ready for movement forwardly to the next stitching step. It will be appreciated that a skilled operator can perform this work very rapidly, and as a step-by-step operation, utilizing standard sewing machines or other stitching devices at present in use in the trade.

Figure 2:
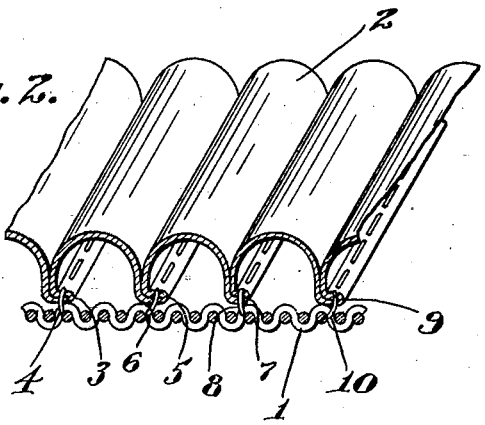
Fig. 2 is a perspective cross-sectional detail, also enlarged, of the completed article.

The two strips 1 and 2 having now been united throughout a predetermined length, the tension on the elastic strip 1 is released and the same contracts to its normal consistency and resiliency, producing the even corrugations as illustrated in Fig. 2. Thus I produce a novel corrugated trimming, having an invisible bond between the facing material and the elastic body or base, and one which presents an imperforate surface to the eye of the observer, which is neat in appearance, strong, and with a great amount of elasticity in the completed article.

Figures 3, 4:
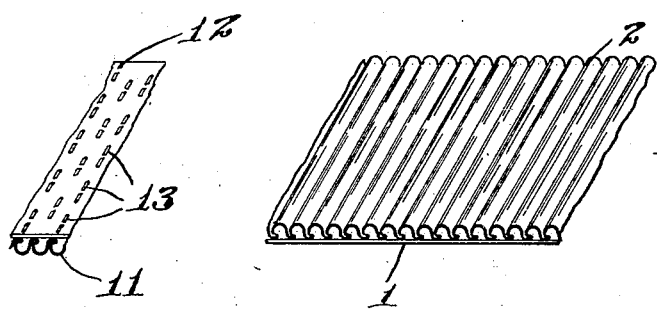
Fig. 3 is a more nearly life-size perspective of the completed trimming.
Fig. 4 is a perspective detail of a modification of such trimming, wherein staples have been utilized in place of stitching.

It will be appreciated that I am not limited to the use of stitching for uniting the facing material and elastic base, but may utilize any other suitable or desirable attaching means. In Fig. 4 I have illustrated such a modification wherein the strip 11 of facing material is united to the elastic base 12 by means of staples 13, applied in transverse rows across the two strips and forming a firm binding or union, and presenting to the eye of the observer the same imperforate surface and appearance as the material illustrated in Figs. 2 and 3.

While I have necessarily described my invention somewhat in detail, it will be appreciated that I am not limited to the specific details set forth, but may vary the style, size, shape and arrangement of same within wide limits, so long as I adhere to the general principle of an invisible bond between the two materials, without departing from the spirit of the invention.

My invention is further described and defined in the form of claims as follows:

1. The improved process of forming corrugated trimming, which consists in utilizing a strip of elastic material under tension, applying a strip of trimming material thereto, turning back the trimming material at predetermined spaced intervals to form folds therein, uniting the trimming material and the elastic strip by fastening devices through the folds and the elastic strip and invisible on the face of the completed article, and releasing the tension on the elastic strip, whereby a trimming having a corrugated facing, is produced.

2. The improved process of forming corrugated trimming, which consists in utilizing a strip of elastic material under tension, applying a strip of trimming material to the elastic strip, turning back the trimming material at predetermined spaced intervals to form transverse folds therein, uniting the trimming material and the elastic strip by transverse fastening devices through the folds and the elastic strip, and invisible on the face of the completed article, and releasing the tension on the elastic strip, whereby a trimming having a corrugated facing, is produced.

3. The improved process of forming corrugated trimming which consists in utilizing a strip of elastic material under tension, applying a strip of trimming material to the elastic strip, turning back the trimming material at predetermined spaced intervals to form transverse folds therein, uniting the trimming material and the elastic strip by transverse stitching through the folds and the elastic strip, and invisible on the face of the completed article, and releasing the tension on the elastic strip, whereby a trimming having a corrugated facing, is produced.

4. The improved process of forming corrugated trimming, which consists in utilizing a strip of elastic material under tension, applying a strip of trimming material to the elastic strip, turning back the trimming material at predetermined spaced intervals to form transverse folds therein, uniting the trimming material and the elastic strip by progressive transverse stitching through the folds and the elastic strip and invisible on the face of the completed article, and releasing the tension on the elastic strip, whereby a trimming having an imperforate corrugated facing, is produced.

In testimony whereof, I have signed my name to this specification.

A. WALDO ROCKWOOD.